United States Patent
Ketels et al.

(10) Patent No.: US 10,232,743 B2
(45) Date of Patent: Mar. 19, 2019

(54) RECLINER ACTUATOR FOR VEHICLE SEAT

(71) Applicant: Faurecia Automotive Seating, LLC, Auburn Hills, MI (US)

(72) Inventors: Cedric Ketels, Holland, MI (US); Jeffery T. Bonk, Chesterfield, MI (US); Tristan J. Vanfossen, Belmont, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 0 days.

(21) Appl. No.: 15/808,226

(22) Filed: Nov. 9, 2017

(65) Prior Publication Data

US 2018/0134184 A1    May 17, 2018

Related U.S. Application Data

(60) Provisional application No. 62/422,210, filed on Nov. 15, 2016.

(51) Int. Cl.
*B60N 2/20* (2006.01)
*B60N 2/22* (2006.01)
*F03G 7/06* (2006.01)

(52) U.S. Cl.
CPC .............. *B60N 2/22* (2013.01); *F03G 7/065* (2013.01)

(58) Field of Classification Search
CPC .................................. B60N 2/22; F03G 7/065
USPC ................... 297/361.1–376, 378.12, 378.14
See application file for complete search history.

(56) References Cited

U.S. PATENT DOCUMENTS

| | | | |
|---|---|---|---|
| 7,188,473 B1* | 3/2007 | Asada | F03G 7/065 310/306 |
| 7,547,070 B2 | 6/2009 | Nathan | |
| 7,556,315 B2 | 7/2009 | Nathan | |
| 7,823,972 B2* | 11/2010 | Browne | B60N 2/002 297/362.11 X |
| 7,931,337 B2 | 4/2011 | Lawall | |
| 8,948,962 B2* | 2/2015 | Pywell | B60N 2/0228 297/378.12 |
| 8,998,320 B2* | 4/2015 | Mankame | B60N 2/002 297/361.1 X |
| 2003/0173863 A1* | 9/2003 | Butera | E05B 47/0009 310/307 |
| 2005/0023086 A1 | 2/2005 | Szilagyi | |
| 2006/0145544 A1* | 7/2006 | Browne | F03G 7/065 310/306 |
| 2008/0034749 A1* | 2/2008 | Ukpai | F03G 7/065 60/527 |
| 2008/0034750 A1* | 2/2008 | Gao | F03G 7/065 60/527 |
| 2011/0163769 A1* | 7/2011 | Herrera | F03G 7/065 324/691 |

(Continued)

FOREIGN PATENT DOCUMENTS

DE   102006048123   4/2008

*Primary Examiner* — Rodney B White
(74) *Attorney, Agent, or Firm* — Barnes & Thornburg LLP (57) ABSTRACT

An occupant support adapted for use in a vehicle includes a seat bottom coupled to a floor of the vehicle and a seat back configured to pivot about a seat-back pivot axis relative to the seat bottom. The occupant support further includes a recliner configured to control movement of the seat back relative to the seat bottom and a recliner actuator configured to lock and unlock the recliner.

16 Claims, 7 Drawing Sheets

(56) References Cited

U.S. PATENT DOCUMENTS

| | | | | |
|---|---|---|---|---|
| 2012/0137672 A1* | 6/2012 | Pinto, IV | F03G 7/065 | 60/527 |
| 2012/0161579 A1* | 6/2012 | Browne | F15B 15/10 | 310/330 |
| 2012/0198835 A1* | 8/2012 | Skurkis | F03G 7/065 | 60/527 |
| 2012/0216524 A1* | 8/2012 | Browne | F03G 7/06 | 60/527 |
| 2012/0216526 A1* | 8/2012 | Browne | F03G 7/065 | 60/529 |
| 2012/0216527 A1* | 8/2012 | Browne | F03G 7/06 | 60/529 |
| 2012/0223727 A1* | 9/2012 | Gao | F03G 7/065 | 324/691 |
| 2012/0234000 A1* | 9/2012 | Browne | F03G 7/065 | 60/527 |
| 2012/0297763 A1* | 11/2012 | Mankame | F03G 7/065 | 60/527 |
| 2013/0199172 A1* | 8/2013 | Strom | F03G 7/065 | 60/527 |
| 2013/0205770 A1* | 8/2013 | Browne | F03G 7/065 | 60/527 |
| 2013/0240320 A1* | 9/2013 | Browne | F03G 7/065 | 192/84.9 |
| 2013/0241343 A1* | 9/2013 | Browne | F03G 7/065 | 310/300 |
| 2014/0007572 A1* | 1/2014 | Buravalla | F03G 7/065 | 60/529 |
| 2014/0026554 A1* | 1/2014 | Browne | F03G 7/065 | 60/527 |
| 2014/0026679 A1* | 1/2014 | Mankame | F03G 7/065 | 73/862.53 |
| 2014/0306624 A1* | 10/2014 | Namuduri | F03G 7/065 | 318/116 |
| 2015/0260170 A1* | 9/2015 | Alexander | F03G 7/065 | 318/117 |
| 2015/0285229 A1* | 10/2015 | Nicolini | F03G 7/065 | 60/527 |
| 2018/0134191 A1* | 5/2018 | Ketels | B60N 2/501 | |

* cited by examiner

RECLINER ACTUATOR FOR VEHICLE SEAT

PRIORITY CLAIM

This application claims priority under 35 U.S.C. § 119(e) to U.S. Provisional Application No. 62/422,210, filed Nov. 15, 2016, which is expressly incorporated by reference herein.

BACKGROUND

The present disclosure relates to recliner actuators, and particularly to recliner actuators adapted for use with occupant supports. More particularly, the present disclosure relates to recliner actuators for controlling occupant supports having reclining seat backs for use in vehicles.

SUMMARY

According to the present disclosure, a vehicle includes an occupant support mounted to a floor of the vehicle. The occupant support includes a seat bottom coupled to the floor of the vehicle and a seat back coupled to the seat bottom for movement about a seat-back pivot axis relative to the seat bottom between an upright position and a folded-forward position. The occupant support further includes a recliner configured to control movement of the seat back about the seat-back pivot axis relative to the seat bottom.

In illustrative embodiments, the occupant support includes a recliner actuator configured to move selectively the recliner between a locked arrangement and an unlocked arrangement in response to an input. In the locked arrangement, the recliner blocks the seat back from pivoting relative to the seat bottom. In the unlocked arrangement, the recliner allows the seat back to pivot relative to the seat bottom.

In illustrative embodiments, the recliner actuator includes a lock unit coupled to the recliner, a shape-memory alloy wire coupled to the lock unit, and a thermal controller configured to heat the shape-memory alloy wire to vary a length of the shape-memory alloy wire in response to receiving the input. By varying the length of the shape-memory alloy wire, the wire moves the lock unit which causes the lock unit to move the recliner from the locked arrangement to the unlocked arrangement to allow the seat back to move relative to the seat bottom.

In illustrative embodiments, the lock unit includes a release lever and a control lever. The release lever is coupled to the recliner and is movable between a plurality of positions to lock and unlock the recliner. The control lever is coupled to the shape-memory alloy wire and configured to move in response to the shape-memory alloy wire changing shape. Movement of the control lever causes movement of the release lever.

In illustrative embodiments, the length of the shape-memory alloy wire can be controlled to maintain a desired position of the release lever and control lever and, thus, the recliner can be held in the unlocked arrangement until a desired seat back position is achieved. The thermal controller is configured to modulate electric current of electric energy conducted through the shape-memory alloy wire to control the length of the shape-memory alloy wire. As a result, the recliner actuator may hold the recliner in an unlocked arrangement so long as the input is received. The recliner actuator may lock the recliner in response to the input being removed to block movement of the seat back relative to the seat bottom.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
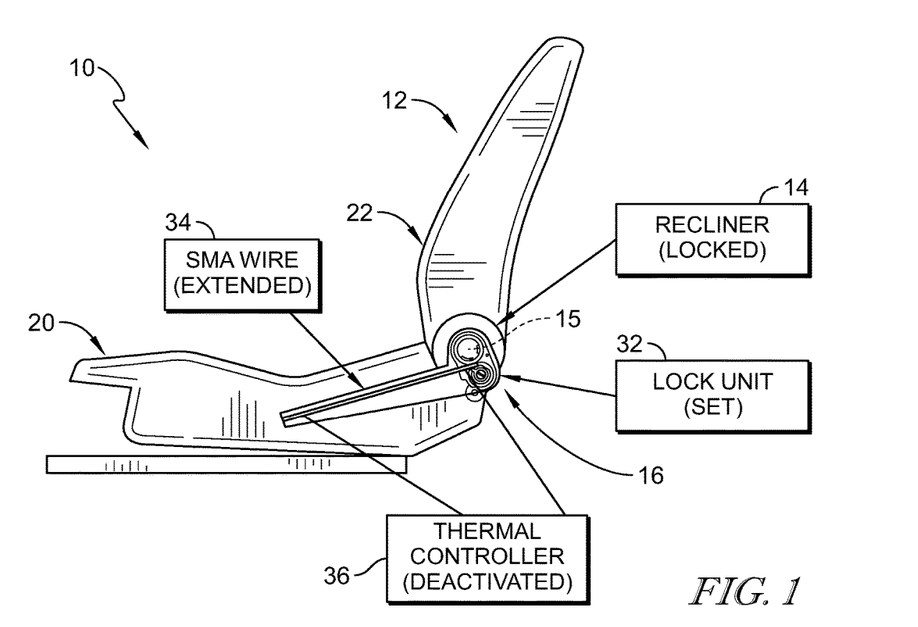
FIG. 1 is a side elevation and diagrammatic view of an occupant support adapted for use in a passenger vehicle showing that the occupant support includes a seat having a movable seat back, a recliner configured to block and allow movement of the seat back relative to a seat bottom of the seat, and a recliner actuator having a lock unit coupled to the recliner, a shape-memory alloy wire, and a thermal controller configured to heat the shape-memory alloy wire to move the lock unit and cause the lock unit to unlock the recliner to allow movement of the seat back.
Figure 2:
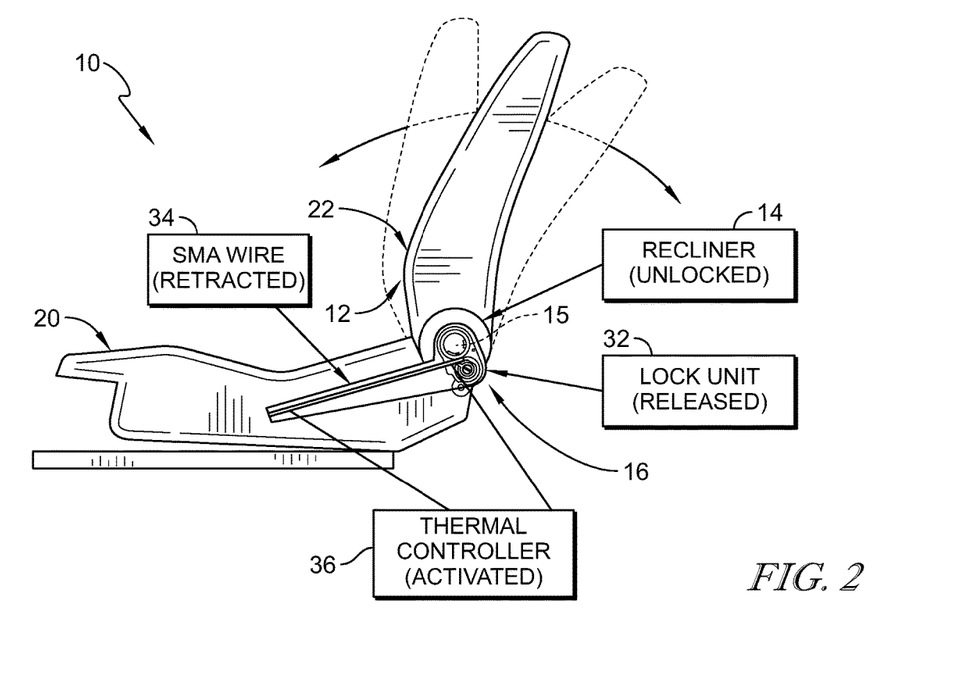
FIG. 2 is a side elevation and diagrammatic view of the occupant support of FIG. 1 showing that the thermal controller is activated to vary a length of the shape-memory alloy wire to release the lock unit and unlock the recliner to allow the seat back to move relative to the seat bottom in response to receiving an input.

A recliner actuator 16 in accordance with the present disclosure is adapted for use with an occupant support 10 of a vehicle as shown in FIGS. 1 and 2. Occupant support 10 includes a seat 12 mounted to a floor of the vehicle, a recliner 14 coupled to seat 12, and recliner actuator 16 configured to move recliner 14 between a locked arrangement in which a seat back 18 of seat 12 is blocked from moving relative to a seat bottom 20 of seat 12, shown in FIG. 1, and an unlocked arrangement in which seat back 18 is allowed to move relative to seat bottom 20 as shown in FIG. 2.

Recliner actuator 16 includes a lock unit 32, a shape-memory alloy wire 34, and a thermal controller 36 as shown in FIGS. 1 and 2. Lock unit 32 is coupled to recliner 14 and configured to unlock selectively recliner 14. Shape-memory alloy wire 34 is coupled to lock unit 32 and seat bottom 18. Thermal controller 36 is configured to heat shape-memory alloy wire 34 in response to receiving an input, for example, from an occupant of occupant support 10 to vary a length of shape-memory alloy wire 34. Shape-memory alloy wire 34 moves lock unit 32 when its length changes to cause lock unit 32 to move recliner 14 to the unlocked arrangement as suggested in FIG. 2.

Figure 5:
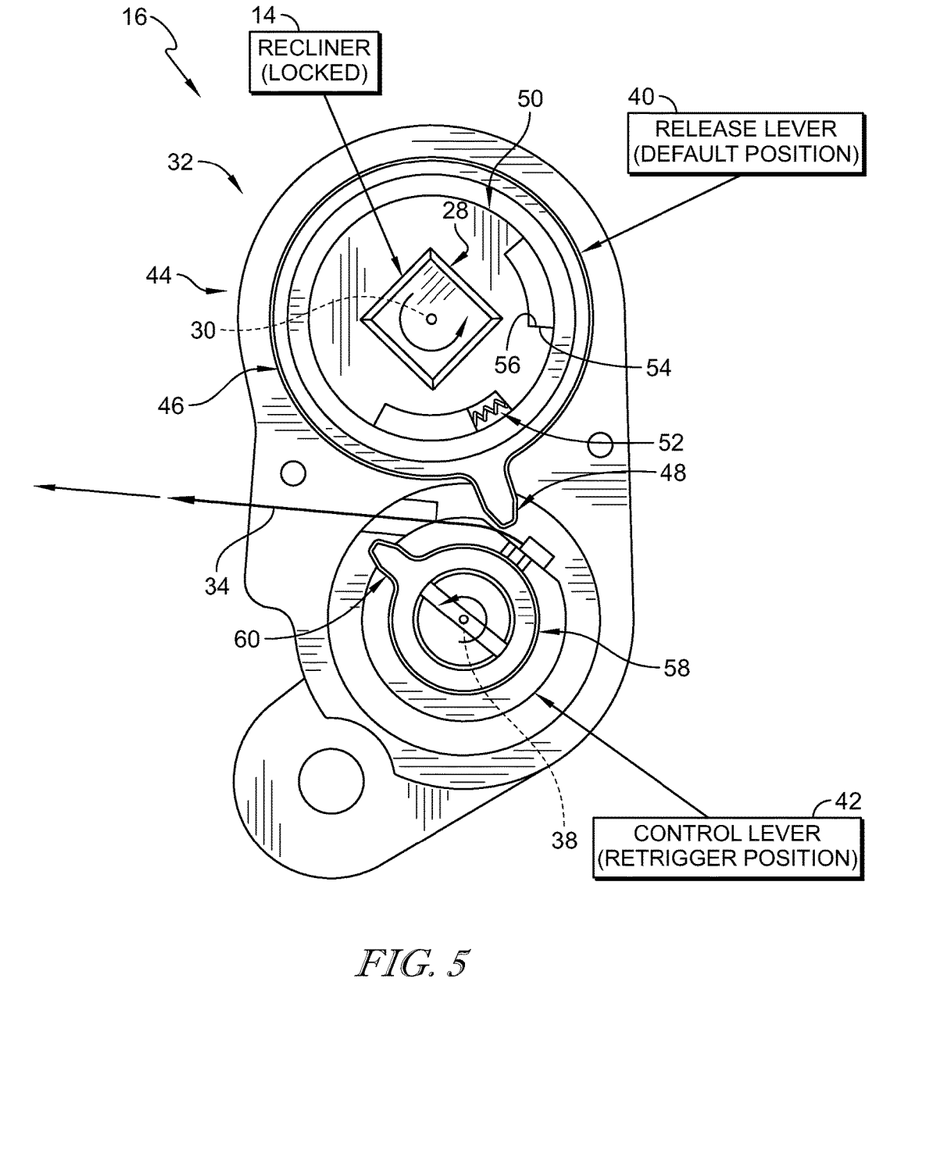
FIG. 5 is a view similar to FIG. 4 of the recliner actuator showing that the length of the shape-memory alloy wire has been reduced further to move the control lever to a retrigger position and suggesting that the release lever is free to move toward the default position to lock the recliner in response to the control lever moving to the retrigger position.
Figure 6:
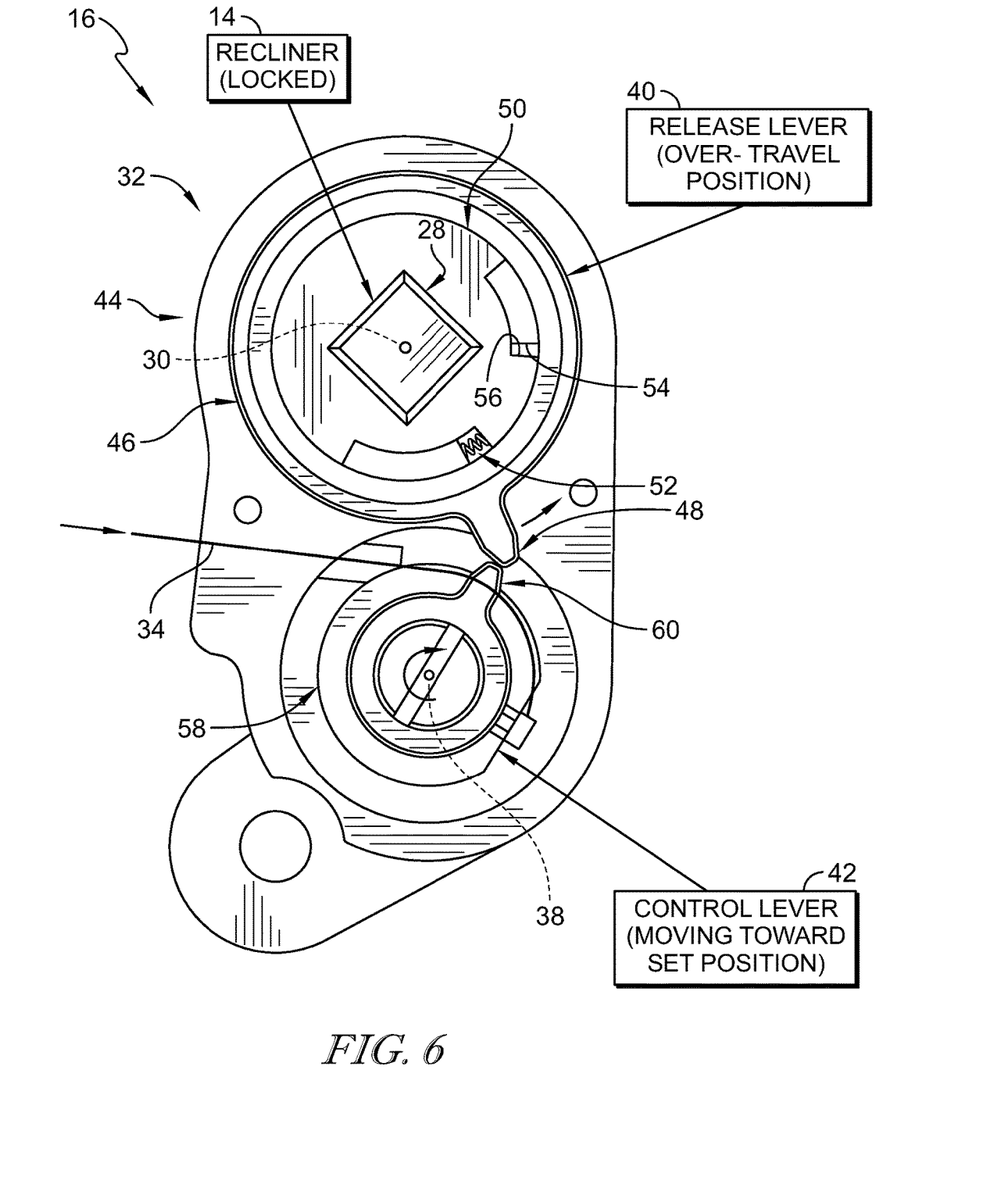
FIG. 6 is a view similar to FIG. 5 of the recliner actuator showing that the length of the shape-memory alloy wire may vary to allow the control lever to move toward the set position and suggesting that the release lever is moved temporarily to an over-travel position to allow the control lever to assume the set position.

Recliner 14 is biased toward the locked arrangement and moves from the unlocked arrangement to the locked arrangement in response to the input being removed as suggested in FIGS. 5 and 6. For example, in response to the input being removed, thermal controller 36 further heats shape-memory alloy wire 34 to further shorten the length of shape-memory alloy wire 34. As a result, lock unit 32 is moved to allow recliner 14 to move from the unlocked arrangement to the locked arrangement relatively quickly without relying on shape-memory alloy wire 34 cooling as suggested in FIG. 5. Shape-memory alloy wire 34 cools over time to reset recliner actuator 16 so that recliner actuator 16 is ready to unlock recliner 14 again as suggested in FIG. 6.

Figure 8:
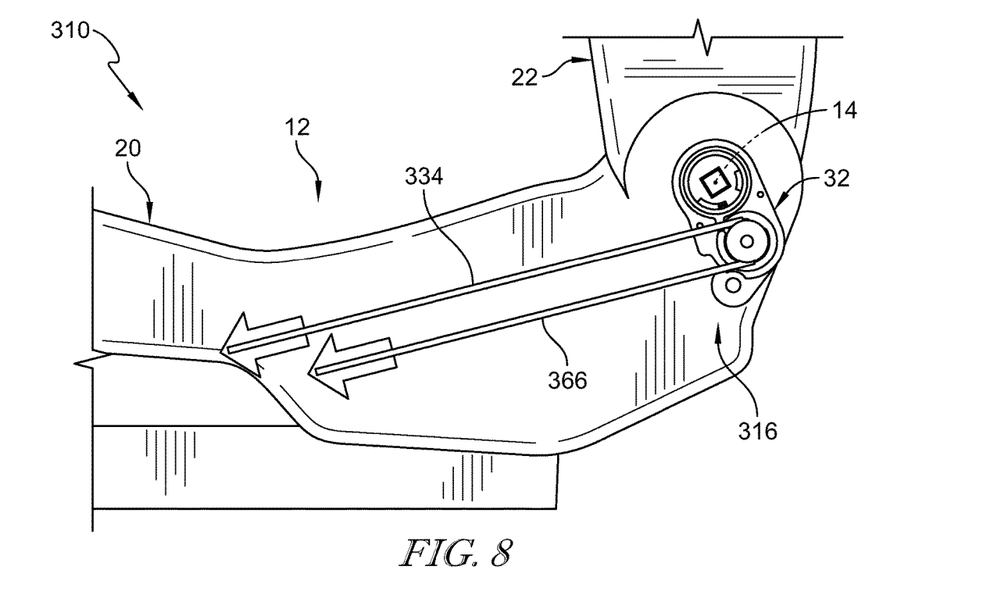
FIG. 8 is a side elevation view of another embodiment of an occupant support showing the seat bottom, the recliner, and a recliner actuator coupled to the recliner, the recliner actuator including a plurality of shape-memory alloy wires configured to move selectively a control lever included in the recliner actuator between the brace position and the set position.
Figure 9:
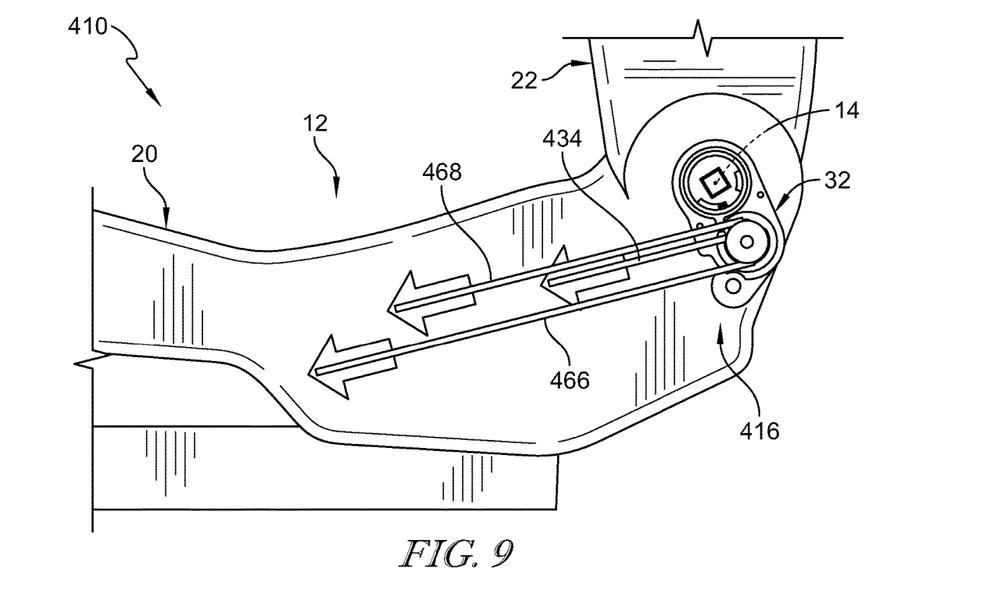
FIG. 9 is a side elevation view of another embodiment of an occupant support showing the seat bottom, the recliner, and a recliner actuator coupled to the recliner, the recliner actuator including a plurality of shape-memory alloy wires configured to move selectively a control lever included in the recliner actuator between a set position, a brace position, and a retrigger position.

In some embodiments, recliner actuator includes a plurality of shape-memory alloy wires as suggested in FIGS. 8 and 9. The thermal controller is configured to heat selectively each shape-memory alloy wire to operate the recliner actuator. For example, a first wire may be heated to unlock the recliner and a second wire may be heated to reset the recliner actuator as suggested in FIG. 8. A third wire may be heated after the first wire so that the thermal controller need not hold the length of the first wire at two different lengths.

In the illustrative embodiment, occupant support 10 is a driver side occupant support 10 as suggested in FIG. 1. Occupant support 10 includes seat 12, recliner 14, and recliner actuator 16 as shown in FIGS. 1 and 2.

Seat 12 is adapted to support an occupant in the vehicle and includes seat bottom 20 and seat back 22 as shown in FIGS. 1 and 2. Seat bottom 20 is coupled to the floor of the vehicle for movement therewith. Seat back 22 is coupled to seat bottom 20 for movement about seat-back pivot axis 15 relative to seat bottom 12 between an upright position and a folded-forward position.

Recliner 14 is coupled to seat bottom 20 and seat back 22 as suggested in FIGS. 1 and 2. Recliner 14 is configured to move between the locked arrangement, suggested in FIG. 1, and the unlocked arrangement, suggested in FIG. 2. In the locked arrangement, recliner 14 blocks seat back 22 from moving relative to seat bottom 20. In the unlocked arrangement, recliner 14 frees seat back 22 from moving relative to seat bottom 20. In some embodiments, recliner 14 is configured to move seat back 22 relative to seat bottom 20 in response to an input when recliner 14 is in the unlocked arrangement.

In some embodiments, recliner 14 is configured to move seat back 22 relative to seat bottom 20 in response to a second input when recliner 14 is in the locked arrangement. For example, recliner 14 may comprise a continuous recliner feature that allows recliner 14 to selectively block movement or move seat back 22 when recliner 14 is in the locked arrangement.

In some embodiments, recliner 14 is coupled to at least one of seat bottom 20 and the seat back 22. Recliner 14 is configured to move between the locked arrangement in which recliner 14 blocks seat back 22 from pivoting about seat-back pivot axis 15 relative to seat bottom 20 and an unlocked arrangement in which recliner 14 allows seat back 22 to pivot about seat-back pivot axis 15 relative to seat bottom 20. Recliner 14 is biased toward the locked arrangement.

Figure 3:
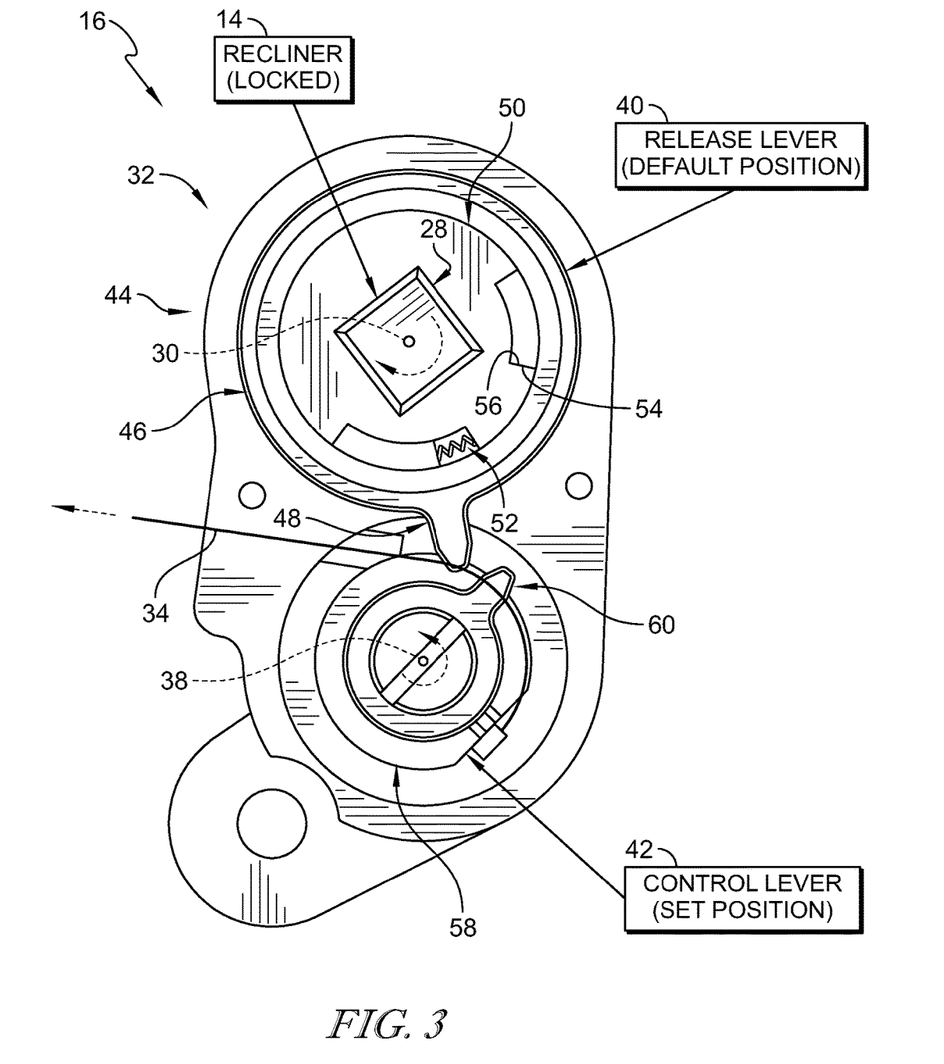
FIG. 3 is a front elevation and diagrammatic view of the recliner actuator of FIG. 1 showing that lock unit includes a release lever coupled to the recliner and a control lever coupled to the shape-memory alloy wire and that the recliner is locked when the release lever is in a default position and the control lever is a set position.

Recliner 14 includes a shaft 28 coupled to recliner actuator 16 as shown in FIGS. 3-6. Shaft 28 is configured to rotate about a first axis 30 to move recliner 14 between the locked and unlocked arrangements. Shaft 28 is biased toward a locked position in which recliner 14 is in the locked arrangement as shown in FIG. 3. In the illustrative example, recliner 14 moves to the unlocked arrangement in response to shaft 28 being rotated about first axis 30 in a clockwise direction to an unlocked position. Recliner 14 moves from the unlocked arrangement to the locked arrangement in response to shaft 28 being rotated about first axis 30 in a counterclockwise direction to the locked position.

Recliner actuator 16 is configured to move selectively recliner 14 between the locked arrangement and the unlocked arrangement as suggested in FIGS. 3-6. Recliner actuator 16 includes lock unit 32, shape-memory alloy wire 34, and thermal controller 36. Lock unit 32 is coupled to recliner 14 and configured to move recliner 14 between the locked arrangement and the unlocked arrangement in response to the input to recliner actuator 16. Shape-memory alloy wire is coupled to lock unit 32 and to seat bottom 20. Thermal controller 36 is configured to heat shape-memory alloy wire 34 to vary a length of shape-memory alloy wire 34 in response to receiving the input to cause shape-memory alloy wire 34 to actuate lock unit 32 and cause lock unit 32 to move recliner 14 from the locked arrangement to the unlocked arrangement.

The input can be for example, occupant input such as activating a switch such as, for example, a button, toggle, a software based switch via a touchscreen, or any other suitable alternative. The input can come from the vehicle. For example, the vehicle may include a sensing system that determines occupant health states and generates input to activate recliner actuator 16 in response to the occupant health states. The occupant health states could include occupant comfort, stress, alertness, etc.

Lock unit 32 includes a release lever 40, a control lever 42, and a housing 44 as shown in FIG. 3. Release lever 40 is coupled to recliner 14 and configured to move recliner 14 between the locked and unlocked arrangement. Control lever 42 is coupled to shape-memory alloy wire 34 and configured to control movement of release lever 40. Housing 44 is arranged around release lever 40 and control lever 42.

Release lever 40 is coupled to shaft 28 included in recliner 14 as shown in FIG. 3. Release lever 40 is movable between a default position, shown in FIG. 3, in which recliner 14 is in the locked arrangement and a lock-release position, shown in FIG. 4, in which recliner 14 is in the unlocked arrangement. Release lever 40 is biased toward the default position. Release lever 40 is configured to rotate in the counter-clockwise direction beyond the default position to an over-travel position as shown in FIG. 6.

Release lever 40 includes a body 46 and a spur 48 that extends away from body 46 as shown in FIG. 3. Release lever 40 further includes over-travel member 50 and a bias member 52. Body 46 and over-travel member 50 are coupled to shaft 28 of recliner 14. Bias member 52 is located between body 46 and over-travel member 50. Spur 48 extends away from body 46 and is configured to be engaged by control lever 42 to rotate body 46 and over-travel member 50 about first axis 30.

Figure 4:
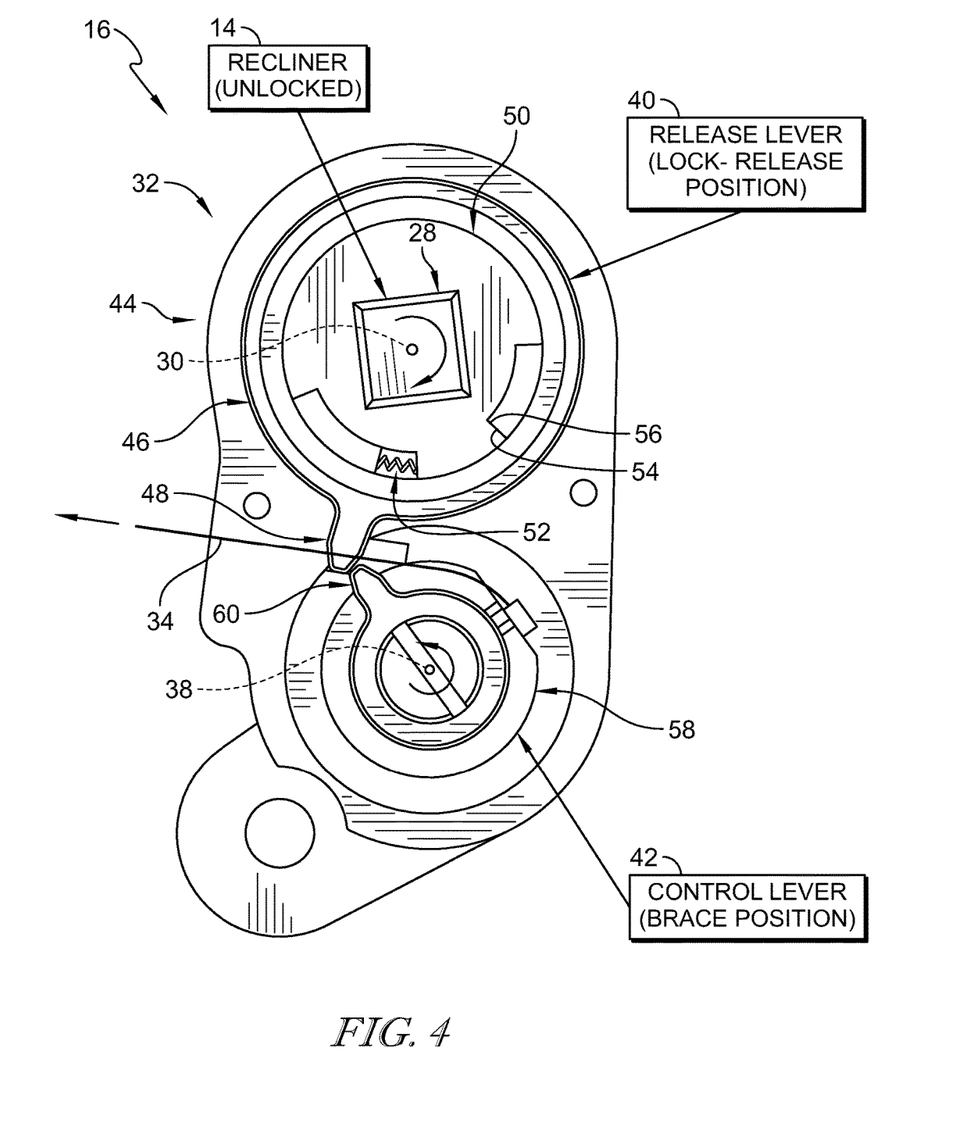
FIG. 4 is a view similar to FIG. 3 of the recliner actuator showing that the length of the shape-memory alloy wire has been reduced to move the control lever to a brace position and suggesting that the control lever moves the release lever to a lock-release position to unlock the recliner in response to the control lever moving to the brace position.

Body includes a pusher surface 54 and over-travel member 50 includes an abutment surface 56 as shown in FIGS. 3-6. Over-travel member 50 is configured to rotate about first axis 30 with body 46 when release lever 40 is rotated to clockwise toward the lock-release position as shown in FIGS. 3 and 4. When body 46 is rotated in the clockwise direction from the default position to the lock-release position, pusher surface 54 engages and pushes abutment surface 56 of over-travel member 50 to cause over-travel member 50 to move with body 46. Body 46 is rotatable counter-clockwise beyond the default position to an over-travel position relative to over-travel member 50 as shown in FIG. 6. When body 46 is rotated in the counter-clockwise direction from the default position to the over-travel position, pusher surface 54 is spaced apart from abutment surface 56 to allow body 46 to move relative to over-travel member 50.

Control lever 42 is coupled to shape-memory alloy wire 34 and configured to move release lever 40 from the default position to the lock-release position in response to the length of shape-memory alloy wire 34 being varied to cause lock unit 32 to move recliner 14 from the locked arrangement to the unlocked arrangement as suggested in FIGS. 3 and 4. Control lever 42 includes a body 58 and a spur 60 that extends away from body 58.

Control lever 42 is configured to rotate about a second axis 38 as suggested in FIGS. 3-6. Shape-memory alloy wire 34 is coupled to body 58 at a portion spaced apart from second axis 38. By varying a length of shape-memory alloy wire 34, shape-memory alloy wire 34 rotates body 58 and, thus, control lever 42 about second axis 38. A sensor such as an angle sensor or potentiometer may be used to determine the orientation of control lever 42 and/or release lever 40.

Control lever 42 is configured to rotate about second axis 38 between a set position, shown in FIG. 3, and a brace position, shown in FIG. 4. Control lever 42 is biased toward the set position. In the set position, release lever 40 is in the default position as shown in FIG. 3. In the brace position, control lever 42 is configured to block movement of release lever 40 away from the lock-release position.

Control lever 42 is rotatable counter-clockwise beyond the brace position to a retrigger position as shown in FIG. 5. In the retrigger position, release lever 40 is free to move toward the default position. Control lever 42 moves release lever 40 from the default position to the over-travel position when control lever 42 rotates from the retrigger position to the set position as suggested in FIG. 5.

In some embodiments, wire 34 includes a specialized type of shape-memory alloy (SMA) wire. An example of specialized type of shape-memory alloy wire is multiple memory material (MMM) wire. This allows the wire to actuate with variable deformation (contraction) based on the temperature.

In some embodiments, wire 34 comprises a typical shape-memory alloy wire (single deformation above a predetermined temperature as opposed to variable deformation associated with MMM wire). In some embodiments, two or more shape-memory alloy wires may be used to have variable levels of actuation (contraction) required for the mechanism.

Because recliner actuator 16 is activated by thermal controller 36 heating shape-memory alloy wire 34, the input to recliner actuator 16 may be spaced apart from lock unit 32. For example, an input device such as a button or touchscreen may be located in a more ergonomic location such as in the dashboard or armrest rather than adjacent the lock unit.

In the illustrative embodiment, shape-memory alloy wire 34 is coupled to seat bottom 20. In other embodiments, shape-memory alloy wire 34 is coupled to any other suitable framework such as, for example, the vehicle floor or seat back 22.

Thermal controller 36 is configured to control the length of the shape-memory alloy wire 34 to cause shape-memory alloy wire 34 as suggested in FIGS. 1 and 2. Thermal controller 36 is configured to apply a current of electric energy through shape-memory alloy wire 34 to control the length of shape-memory alloy wire 34. Thermal controller 36 is configured to modulate the current of electric energy conducted shape-memory alloy wire 34 to maintain a desired length of shape-memory alloy wire 34. In other embodiments, thermal controller 36 is configured to apply heat to shape-memory alloy wire 34 by radiant, conductive, and/or convective heating.

Thermal controller 36 includes at least two leads coupled to wire 34 and spaced apart from one another. One lead can be positively charged and the other lead is negatively charged. Thermal controller 36 is configured to apply a first current of electric energy to shape-memory alloy wire 34 to shorten the length of shape-memory alloy wire 34 and move control lever 42 from the set position to the brace position in response to receiving the input as suggested in FIG. 4. Thermal controller 26 modulates the current to maintain control lever 42 in the brace position in response to the thermal controller receiving the input.

Thermal controller 36 is configured to apply a second current of electric energy greater than the first current to shape-memory alloy wire 34 to further shorten the length of shape-memory alloy wire 34 and move control lever 42 from the brace position to the retrigger position in response to the input being removed as suggested in FIG. 5. Thermal controller 36 is configured to stop applying a current of electric energy through shape-memory alloy wire 34 to allow shape-memory alloy wire 34 to cool and lengthen and, thus, control lever 42 to move from the retrigger position to the set position in response to the input being removed as suggested in FIG. 6.

In operation, recliner 14 is locked, release lever 40 is in the default position, and control lever 42 is in the set position as shown in FIG. 3. The occupant or vehicle provides the input and the input is received by thermal controller 36. In response to receiving the input, thermal controller 36 applies a first current to shape-memory alloy wire 34 to shorten the length of shape-memory alloy wire 34. The first current may be modulated. Shape-memory alloy wire 34 rotates control lever 42 about second axis 38 from the set position to the brace position as wire 34 shrinks.

Rotation of control lever 42 from the set position to the brace position causes spur 60 of control lever 42 to move spur 48 of release lever 40 to rotate release lever 40 to the lock-release position as shown in FIG. 4. Release lever 40 rotates shaft 28 of recliner 14 as release lever moves from the default position to the lock-release position. As shown in FIG. 4, pusher surface 54 of body 46 moves abutment surface 56 of over-travel member 50 to cause over-travel member 50 to move with body 46 as shown in FIG. 4. Bias member 52 biases abutment surface 56 toward pusher surface 54.

Thermal controller 36 modulates the current applied to shape-memory alloy wire 34 to maintain the length of shape-memory alloy wire 34 and maintain the control lever 42 in the brace position. As such, control lever 42 holds release lever 40 in the lock-release position. Recliner 14 is unlocked when release lever 40 is in the lock-release position. The occupant or vehicle is free to move seat back 22 relative to seat bottom 20 when recliner 14 is unlocked. In other embodiments, recliner 14 may move seat back 22 when recliner 14 is unlocked.

After seat back 22 is moved to a desired position, input may be removed. Thermal controller 36 applies the second current to shape-memory alloy wire 34 to further shorten the length of shape-memory alloy wire 34 in response to the input being removed as shown in FIG. 5. The second current is greater than the first current. As a result, shape-memory alloy wire 34 moves control lever 42 from the brace position to the retrigger position to allow for quick relocking of recliner 14 without waiting for wire 34 to cool. With control lever 42 in the retrigger position, release lever 40 is biased to move from the lock-release position to the default position. Recliner 14 moves from the unlocked arrangement to the locked arrangement when release lever 40 is moved to the default position.

As shape-memory alloy wire 34 cools, the length of shape-memory alloy wire 34 increases and control lever 42 moves toward the set position because it is biased toward the set position as suggested in FIG. 6. To return to the set position, spur 60 of control lever 42 moves spur 48 of release lever 40 counter-clockwise. Release lever 40 is moved to the over-travel position by control lever 42 and control lever 42 is free to move to the set position. Release lever 40 then rotates clockwise to the default position shown in FIG. 3.

As release lever 40 moves from the default position to the over-travel position, body 46 moves relative to over-travel member 50 as shown in FIG. 6. Over-travel member 50 is biased to maintain position to keep recliner 14 in the locked position when release lever 40 is moved to the over-travel position to allow control lever 42 to return to the set position. After control lever 42 is in the set position, body 46 moves relative to over-travel member 50 in the clockwise direction to the default position.

A method of operating recliner actuator 16 may include a number of steps. The method may include providing lock unit 32 coupled to recliner 14, shape-memory alloy wire 34 coupled to the lock unit 32, and thermal controller 36. The method may include receiving the input with thermal controller 36. The method may include heating shape-memory alloy wire 34 with thermal controller 36 in response to thermal controller 36 receiving the input to vary the length of shape-memory alloy wire 34 to cause shape-memory alloy wire 34 to move lock unit 32. The method may include unlocking recliner 14 in response to movement of lock unit 32. The method may include heating shape-memory alloy wire 34 with thermal controller 36 to reduce the length of shape-memory alloy wire 34 in response to the input being removed.

Figure 7:
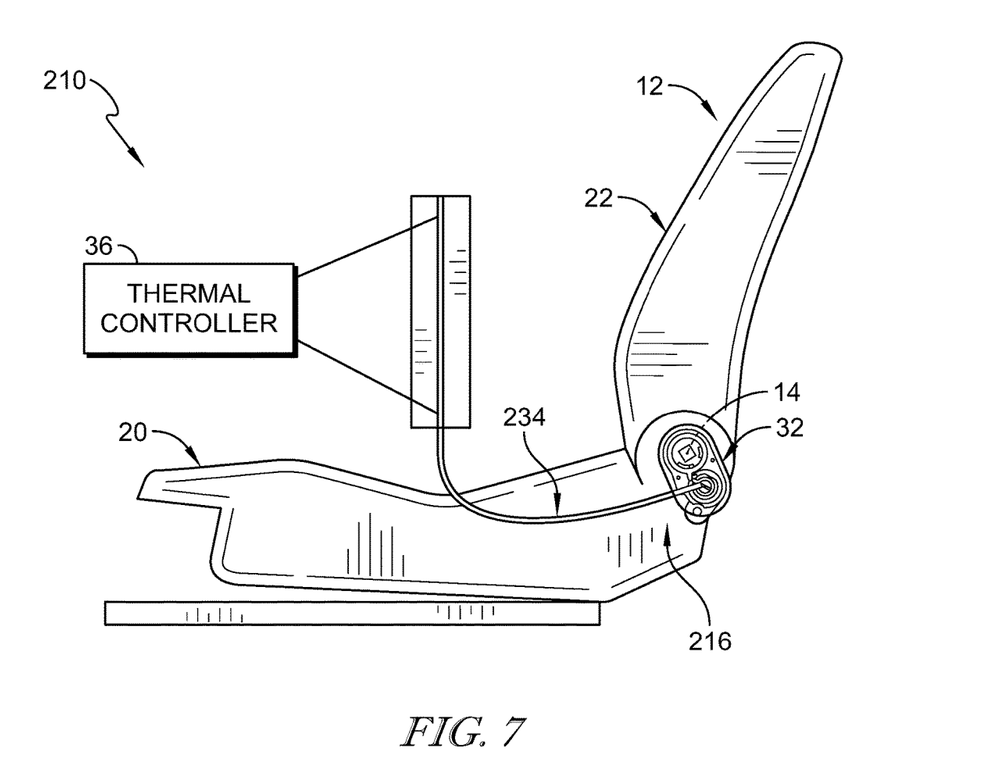
FIG. 7 is a side elevation view of another embodiment of an occupant support showing the shape-memory alloy wire is arranged to have a different path relative to the seat.

Another illustrative occupant support 210 is shown in FIG. 7. Occupant support 210 is substantially similar to the occupant support 10 shown in FIGS. 1-6 and described herein. Accordingly, similar reference numbers in the 200 series indicate features that are common between occupant support 210 and occupant support 10. The description of occupant support 10 is hereby incorporated by reference to apply to occupant support 210, except in instances when it conflicts with the specific description and drawings of occupant support 210.

As shown in FIG. 7, occupant support 210 includes a shape-memory alloy wire 234. Shape-memory alloy wire 234 is curved along a path different than the path shown in FIGS. 1 and 2. Shape-memory alloy wire 234 may extend along any number of paths.

Another illustrative occupant support 310 is shown in FIG. 8. Occupant support 310 is substantially similar to the occupant support 10 shown in FIGS. 1-6 and described herein. Accordingly, similar reference numbers in the 300 series indicate features that are common between occupant support 310 and occupant support 10. The description of occupant support 10 is hereby incorporated by reference to apply to occupant support 310, except in instances when it conflicts with the specific description and drawings of occupant support 310.

Occupant support 310 includes a recliner actuator 316 as shown in FIG. 8. Recliner actuator 316 includes lock unit 32, thermal controller 36, a first shape-memory alloy wire 334, and a second shape-memory alloy wire 366. First shape-memory alloy wire 334 is coupled to control lever 42 and configured to move control lever 42 between the set, brace, and retrigger position in response to a length of first shape-memory alloy wire 334 being shortened. Second shape-memory alloy wire 366 is coupled to control lever 42 and configured to move control lever 42 from the retrigger position to the set position in response to a length of second shape-memory alloy wire 366 being shortened. Thermal controller 36 is configured to heat selectively first and second shape-memory alloy wires 334, 366 control lock unit 32.

Another illustrative occupant support 410 is shown in FIG. 9. Occupant support 410 is substantially similar to the occupant support 10 shown in FIGS. 1-6 and described herein. Accordingly, similar reference numbers in the 400 series indicate features that are common between occupant support 410 and occupant support 10. The description of occupant support 10 is hereby incorporated by reference to apply to occupant support 410, except in instances when it conflicts with the specific description and drawings of occupant support 410.

Occupant support 410 includes a recliner actuator 416 as shown in FIG. 9. Recliner actuator 416 includes lock unit 32, thermal controller 36, a first shape-memory alloy wire 434, a second shape-memory alloy wire 466, and a third shape-memory alloy wire 468. First shape-memory alloy wire 434 is coupled to control lever 42 and configured to move control lever 42 from the set position to the brace position in response to a length of first shape-memory alloy wire 434 being shortened. Third shape-memory alloy wire 468 is coupled to control lever 42 and configured to move control lever 42 from the brace position to the retrigger position in response to a length of third shape-memory alloy wire 468 being shortened. Second shape-memory alloy wire 466 is coupled to control lever 42 and configured to move control lever 42 from the retrigger position to the set position in response to a length of second shape-memory alloy wire 466 being shortened. Thermal controller 36 is configured to heat selectively first, second, and third shape-memory alloy wires 434, 466, 468 control lock unit 32.

According to an aspect of the present disclosure, a shape-memory alloy actuator mechanism 16 is provided to actuate seat recliners for rotational movement. This may relate to a remote release of a recliner and track using an electric lock (e-lock). A decrease in weight, occupied volume, and cost may result from such a design.

In some embodiments, the shape-memory alloy actuator mechanism 16 is actuated with a specialized type of shape-memory alloy (SMA) wire. An example of specialized type of shape-memory alloy wire is multiple memory material (MMM) wire. This allows the wire to actuate with variable deformation (contraction) based on the temperature.

In some embodiments, the shape-memory alloy actuator 16 can also be actuated with a typical shape-memory alloy wire (single deformation above a predetermined temperature as opposed to variable deformation associated with MMM wire). In this case, two shape-memory alloy wires may be used to have variable levels of actuation (contraction) required for the mechanism.

Contracting one or more shape-memory alloy wires 34 can be used to unlock and relock a number of different recliners, including discontinuous recliners. Recliners that act as both, continuous and discontinuous, may also be used with shape-memory alloy wires 34.

The torque used to unlock some discontinuous recliners in the market may use a certain amount of force with a specified gear ratio. Some embodiments of the present disclosure provide enough torque through an associated cam. The linear travel used for unlocking to take place may vary in different configurations and designs of recliners.

One parameter to consider is the relocking speed, which is desirable to be maintained below a predetermined amount. The present disclosure may allow relatively fast relocking speed, relying on one or more wires, without a cooling temperature constraint. The mechanism may minimize the weight, package size, and cost. This type of solution may enable remote release of a track in such an application of the shape-memory alloy actuator.

A shape memory alloy (SMA) actuator for a vehicle seat recliner is disclosed. The recliner may be manual, automatic, or a hybrid. The type of recliner may be continuous, discontinuous, or a hybrid. One or more shape-memory alloy wires may be actuated for rotation of the recliner shaft to lock, unlock, or reset the configuration of the shape-memory alloy recliner actuator.

The invention claimed is:

1. An occupant support comprising
a seat including a seat bottom and a seat back coupled to the seat bottom for movement about a seat-back pivot axis relative to the seat bottom between an upright position and a folded-forward position,
a recliner coupled to at least one of the seat bottom and the seat back, the recliner configured to move between a locked arrangement in which the recliner blocks the seat back from pivoting about the seat-back pivot axis relative to the seat bottom and an unlocked arrangement in which the recliner allows the seat back to pivot about the seat-back pivot axis relative to the seat bottom, and the recliner biased toward the locked arrangement, and
a recliner actuator configured to move selectively the recliner between the locked arrangement and the unlocked arrangement in response to receiving an input, the recliner actuator including a lock unit coupled to the recliner and configured to move the recliner between the locked arrangement and the unlocked arrangement, a shape-memory alloy wire coupled to the lock unit and to the seat bottom, and a thermal controller configured to heat the shape-memory alloy wire to vary a length of the shape-memory alloy wire in response to receiving the input to cause the shape-memory alloy wire to actuate the lock unit and cause the lock unit to move the recliner from the locked arrangement to the unlocked arrangement, wherein the lock unit includes a release lever and a control lever, the release lever is coupled to the recliner and is movable between a default position in which the recliner is in the locked arrangement and a lock-release position in which the recliner is in the unlocked arrangement, the control lever is configured to move the release lever from the default position to the lock-release position in response to movement of the control lever, and the shape-memory alloy wire is coupled to the control lever and configured to move the control lever in response to the length of the shape-memory alloy wire being varied.

2. The occupant support of claim 1, wherein the release lever is configured to rotate about a first axis between the default position and the lock-release position and the control lever is configured to rotate about a second axis between a set position in which the release lever is in the default position and a brace position in which the control lever is configured to block movement of the release lever away from the lock-release position.

3. The occupant support of claim 2, wherein the release lever includes a body and a spur that extends away from the body of the release lever, the control lever includes a body and a spur that extends away from the body of the control lever, and the spur of the control lever is configured to move the spur of the release lever and rotate the release lever about the first axis from the default position to the lock-release position in response to rotation of the control lever about the second axis from the set position to the brace position.

4. The occupant support of claim 3, wherein the thermal controller is configured to control the length of the shape-memory alloy wire to cause the shape-memory alloy wire to move the control lever from the set position to the brace position and maintain the control lever in the brace position in response to the thermal controller receiving the input.

5. The occupant support of claim 4, wherein the thermal controller is configured to modulate a current of electric energy conducted through the shape-memory alloy wire to control the length of the shape-memory alloy wire.

6. The occupant support of claim 2, wherein the release lever is biased toward the default position and the control lever is biased toward the set position.

7. An occupant support comprising
a seat including a seat bottom and a seat back coupled to the seat bottom for movement about a seat-back pivot axis relative to the seat bottom between an upright position and a folded-forward position,
a recliner coupled to at least one of the seat bottom and the seat back, the recliner configured to move between a locked arrangement in which the recliner blocks the seat back from pivoting about the seat-back pivot axis relative to the seat bottom and an unlocked arrangement in which the recliner allows the seat back to pivot about the seat-back pivot axis relative to the seat bottom, and the recliner biased toward the locked arrangement, and
a recliner actuator configured to move selectively the recliner between the locked arrangement and the unlocked arrangement in response to receiving an input, the recliner actuator including a lock unit coupled to the recliner and configured to move the recliner between the locked arrangement and the unlocked arrangement, a shape-memory alloy wire coupled to the lock unit and to the seat bottom, and a thermal controller configured to heat the shape-memory alloy wire to vary a length of the shape-memory alloy wire in response to receiving the input to cause the shape-memory alloy wire to actuate the lock unit and cause the lock unit to move the recliner from the locked arrangement to the unlocked arrangement, wherein the lock unit includes a release lever and a control lever, the release lever is coupled to the recliner and is rotatable between a default position in which the recliner is in the locked arrangement and a lock-release position in which the recliner is in the unlocked arrangement, and the control lever is rotatable between a set position in which the release lever is in the default position and a brace position in which the control lever is configured to block movement of the release lever away from the lock-release position.

8. The occupant support of claim 7, wherein the control lever is rotatable beyond the brace position to a retrigger position in which the release lever is free to move toward the default position.

9. The occupant support of claim 8, wherein the release lever is configured to rotate beyond the default position to an over-travel position and the control lever moves the release lever from the default position to the over-travel position when the control lever rotates from the retrigger position to the set position.

10. The occupant support of claim 8, wherein thermal controller is configured to control a current of electric energy conducted through the shape-memory alloy wire to control the length of the shape-memory alloy wire to cause the shape-memory alloy wire to move the control lever to a selected one of the brace position and the retrigger position and to maintain the control lever in the selected one of the brace position and the retrigger position.

11. The occupant support of claim 10, wherein thermal controller is configured to stop the current of electric energy conducted through the shape-memory alloy wire to allow the control lever to move from the retrigger position to the set position in response to the input being removed.

12. An occupant support comprising
a seat including a seat bottom and a seat back coupled to the seat bottom for movement about a seat-back pivot axis relative to the seat bottom,
a recliner coupled to the seat and configured to move between a locked arrangement in which the recliner blocks relative movement between the seat back and the seat bottom and an unlocked arrangement in which the recliner allows relative movement between the seat back and the seat bottom, and
a recliner actuator including a lock unit coupled to the recliner and configured to move the recliner between the locked arrangement and the unlocked arrangement, a shape-memory alloy wire coupled to the lock unit, and a thermal controller configured to heat the shape-memory alloy wire to vary a length of the shape-memory alloy wire in response to receiving an input to cause the shape-memory alloy wire to actuate the lock unit,
wherein the lock unit includes a release lever coupled to the recliner and a control lever coupled to the shape-memory alloy wire, the release lever is movable between a default position and a lock-release position, the recliner is in the locked arrangement when the release lever is in the default position, the recliner moves to the unlocked arrangement in response to movement of the release lever from the default position to the lock-release position, the control lever is movable between a set position and a brace position, movement of the control lever from the set position to the brace position causes movement of the release lever from the default position to the lock-release position, and varying the length of the shape-memory alloy wire causes the control lever to move between the set position to the brace position.

13. The occupant support of claim 12, wherein the recliner is configured to move the seat back relative to the seat bottom about the seat-back pivot axis in response to a second input when the recliner is in the locked arrangement.

14. The occupant support of claim 12, wherein the thermal controller is configured to modulate a current of electric energy conducted through the shape-memory alloy wire to control the length of the shape-memory alloy wire.

15. An occupant support comprising
a seat including a seat bottom and a seat back coupled to the seat bottom for movement about a seat-back pivot axis relative to the seat bottom,
a recliner coupled to the seat and configured to move between a locked arrangement in which the recliner blocks relative movement between the seat back and the seat bottom and an unlocked arrangement in which the recliner allows relative movement between the seat back and the seat bottom, and
a recliner actuator including a lock unit coupled to the recliner and configured to move the recliner between the locked arrangement and the unlocked arrangement, a shape-memory alloy wire coupled to the lock unit, and a thermal controller configured to heat the shape-memory alloy wire to vary a length of the shape-memory alloy wire in response to receiving an input to cause the shape-memory alloy wire to actuate the lock unit,
wherein lock unit includes a release lever coupled to the recliner and configured to rotate about a first axis, the release lever includes a recliner mount, a body, and a spur, the recliner mount is coupled to the recliner and configured to rotate about the first axis to move the recliner between the locked arrangement and the unlocked arrangement, the body is arranged around the recliner mount and configured to move with the recliner mount and relative to the recliner mount, and the spur extends away from the body.

16. The occupant support of claim 15, wherein the release lever is movable between a default position, a lock-release position, and an over-travel position, movement of the body in a first direction from the default position to the lock-release position causes movement of the recliner mount in the first direction, and movement of the body in a second direction opposite the first direction from the default position to the over-travel position does not cause movement of the recliner mount.

* * * * *